(12) United States Patent
Lambert et al.

(10) Patent No.: US 10,473,806 B2
(45) Date of Patent: Nov. 12, 2019

(54) OCEAN BOTTOM SYSTEM

(71) Applicant: ION Geophysical Corporation, Houston, TX (US)

(72) Inventors: Dale J. Lambert, Mandeville, LA (US); André W. Olivier, River Ridge, LA (US)

(73) Assignee: ION Geophysical Corporation, Houston, TX (US)

( * ) Notice: Subject to any disclaimer, the term of this patent is extended or adjusted under 35 U.S.C. 154(b) by 211 days.

(21) Appl. No.: 14/710,373

(22) Filed: May 12, 2015

(65) Prior Publication Data

US 2015/0331126 A1   Nov. 19, 2015

Related U.S. Application Data

(60) Provisional application No. 61/992,684, filed on May 13, 2014.

(51) Int. Cl.
| | | |
|---|---|---|
| *G01V 1/38* | (2006.01) | |
| *G01V 1/18* | (2006.01) | |
| *G01V 1/24* | (2006.01) | |
| *G01V 1/20* | (2006.01) | |

(52) U.S. Cl.
CPC .......... *G01V 1/3808* (2013.01); *G01V 1/189* (2013.01); *G01V 1/201* (2013.01); *G01V 1/24* (2013.01); *G01V 1/3843* (2013.01); *G01V 1/3852* (2013.01); *G01V 1/202* (2013.01)

(58) Field of Classification Search
CPC ...... G01V 1/3843; G01V 1/3852; G01V 1/24; G01V 1/201; G01V 1/189; G01V 1/3808; G01V 1/202; G01V 2001/204
See application file for complete search history.

(56) References Cited

U.S. PATENT DOCUMENTS

| | | | | |
|---|---|---|---|---|
| 3,825,886 | A | * | 7/1974 | Thigpen .................. G01V 1/16 367/177 |
| 5,175,708 | A | | 12/1992 | Dumestre, III |
| 5,583,824 | A | | 12/1996 | Fletcher |
| 5,709,497 | A | | 1/1998 | Zoch et al. |
| 5,781,510 | A | * | 7/1998 | Chang .................... G01V 1/201 367/154 |

(Continued)

FOREIGN PATENT DOCUMENTS

| | | |
|---|---|---|
| EP | 1416299 A1 | 6/2004 |
| WO | 2005/074426 A2 | 8/2005 |

(Continued)

OTHER PUBLICATIONS

International Search Report for PCT/US2015/030540 dated Aug. 19, 2015 from the European Patent Office.

(Continued)

*Primary Examiner* — Ian J Lobo
(74) *Attorney, Agent, or Firm* — Holland & Hart LLP

(57) ABSTRACT

A seismic data collection system is disclosed. The system may include at least a first housing and a second housing. The first housing may be configured to detachably couple to the second housing. The system mays also include various components such as one or more seismic sensors, a clock, or memory. Each of the components may be arranged in one of the first housing or second housing.

17 Claims, 16 Drawing Sheets

(56) References Cited

U.S. PATENT DOCUMENTS

| | | | |
|---|---|---|---|
| 6,024,344 A * | 2/2000 | Buckley | G01V 1/3852 |
| | | | 181/110 |
| 6,295,394 B1 * | 9/2001 | Arab-Sadeghabadi | ...... |
| | | | G01D 5/353 |
| | | | 250/227.14 |
| 6,625,083 B2 | 9/2003 | Vandenbroucke | |
| 7,990,803 B2 * | 8/2011 | Ray | G01V 1/247 |
| | | | 367/15 |
| 8,149,647 B2 * | 4/2012 | Borgen | G01V 1/201 |
| | | | 367/15 |
| 8,446,797 B2 * | 5/2013 | Olivier | G01V 1/20 |
| | | | 367/154 |
| 8,675,446 B2 | 3/2014 | Gateman et al. | |
| 9,448,311 B2 * | 9/2016 | Maxwell | G01V 1/38 |
| 2004/0257913 A1 | 12/2004 | Ray et al. | |
| 2005/0146984 A1 * | 7/2005 | Lee | G01V 1/201 |
| | | | 367/20 |
| 2011/0051550 A1 * | 3/2011 | Lindberg | G01V 1/16 |
| | | | 367/20 |
| 2011/0176383 A1 * | 7/2011 | Jewell | G01V 1/3852 |
| | | | 367/16 |

FOREIGN PATENT DOCUMENTS

| | | |
|---|---|---|
| WO | 2009/039252 A1 | 3/2009 |
| WO | 2011/046820 A2 | 4/2011 |
| WO | 2011/139159 A1 | 11/2011 |
| WO | 2014/118219 A1 | 8/2014 |
| WO | 2014/121250 A2 | 8/2014 |

OTHER PUBLICATIONS

Search opinion for Danish App. No. PA2016-70910, from the Danish Patent and Trademark Office dated Mar. 21, 2017.

* cited by examiner

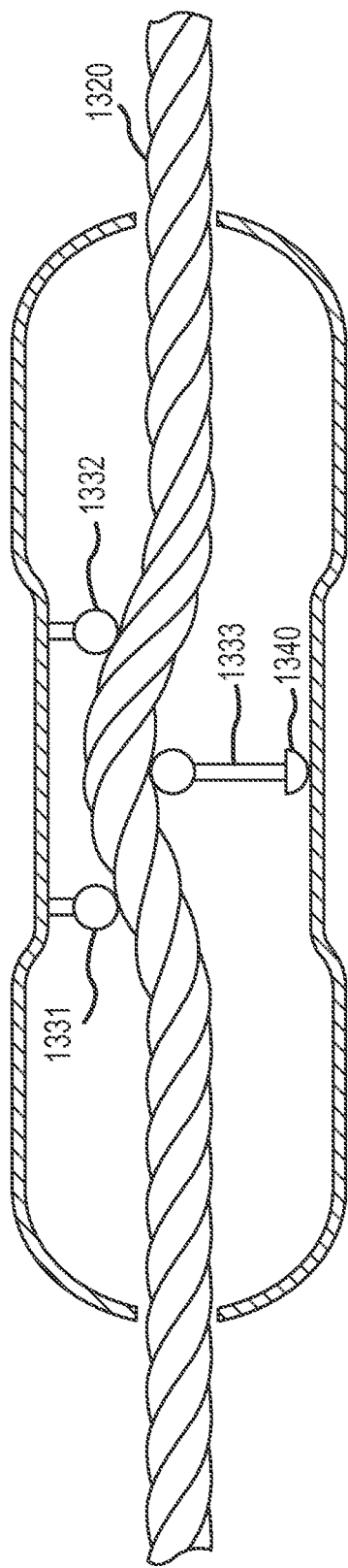

OCEAN BOTTOM SYSTEM

CROSS REFERENCE TO RELATED APPLICATIONS

This application claims priority to and the benefit of U.S. provisional application No. 61/992,684, entitled, "OCEAN BOTTOM SYSTEM," which was filed on May 13, 2014, and which is hereby incorporated by reference in its entirety for all purposes.

BACKGROUND OF THE INVENTION

Field of the Invention

The present invention generally relates to seismic data acquisition, and more specifically to ocean bottom seismic data acquisition systems.

Description of the Related Art

Petrochemical products such as oil and gas are ubiquitous in society and can be found in everything from gasoline to children's toys. Because of this, the demand for oil and gas remains high. In order to meet this high demand, it is important to locate oil and gas reserves in the Earth. Scientists and engineers conduct "surveys" utilizing, among other things, seismic and other wave exploration techniques to find oil and gas reservoirs within the Earth. These seismic exploration techniques often include controlling the emission of seismic energy into the Earth with a seismic source of energy (e.g., dynamite, air guns, vibrators, etc.), and monitoring the Earth's response to the seismic source with one or more receivers in order to create an image of the subsurface of the Earth.

Conventional marine seismic surveys generally involve towing one or more streamer cables comprising a plurality of receivers with a seismic vessel. Each receiver may include, for example, a pressure sensor and/or a particle motion sensor in proximity to one another. The pressure sensor may be, for example, a hydrophone that records scalar pressure measurements of a seismic wavefield. The particle motion sensor may be, for example, a three-component geophone that records vectorial velocity measurements of the seismic wavefield. By observing the reflected seismic wavefield detected by the receiver(s) during the survey, the geophysical data pertaining to reflected signals may be acquired and these signals may be used to form an image indicating the composition of the Earth near the survey location.

BRIEF DESCRIPTION OF THE DRAWINGS

FIGS. 13E and 13F illustrate a method for coupling a sensor station to a rope, according to an embodiment of the invention.

DETAILED DESCRIPTION OF THE PREFERRED EMBODIMENTS

Figure 1:
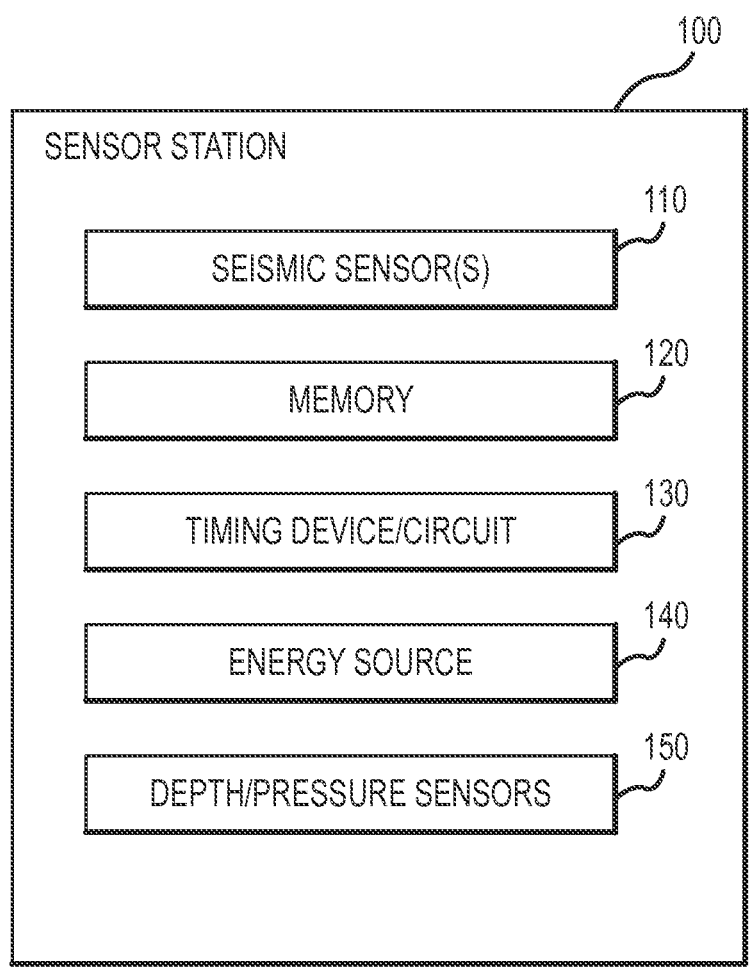
FIG. 1 is a block diagram illustrating exemplary components in an ocean bottom seismic sensor station according to an embodiment of the invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computerized system. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a wireless network. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating exemplary components in an ocean bottom seismic sensor station 100 according to an embodiment of the invention. As shown in FIG. 1, the sensor station 100 may include one or more seismic sensors 110 and a memory device 120. The seismic sensors 110 may include any number and combination of sensors such as hydrophones, geophones, accelerometers, or the like. In one embodiment, the sensors 110 may include a three component (3C) sensor configured to measure the three spatial components of seismic waves. In some embodiments, the seismic sensors 110 may include a digital sensor, for example, a micro electro mechanical system (MEMS) accelerometer. Examples of digital sensors are disclosed in U.S. Pat. No. 6,883,638, filed on Mar. 16, 2009 by Peter Maxwell, et. al., and entitled "Accelerometer Transducer Used for Seismic Prospecting". The disclosure of this patent is hereby incorporated herein by reference in its entirety. The use of digital sensors may have several advantages including the ability to perform automated calibration, reduced manufacturing variance between sensors, improved frequency response, uniform performance in any orientation, small and compact packaging, among others.

In one embodiment, the seismic sensors 110 may include piezo-electric sensors. Examples of piezo-electric sensors are disclosed in U.S. patent application Ser. No. 13/984,255, and U.S. patent application Ser. No. 13/984,266, both filed on Feb. 7, 2012 by Ken Kan Deng, and both entitled "Method and Apparatus for Sensing Underwater Signals". The disclosures of both of these patent applications are hereby incorporated herein by reference in their entirety.

The memory 120 is preferably a random access memory sufficiently large to hold a desired amount of seismic data. While memory 120 is shown as a single entity, it should be understood that memory 120 may in fact comprise a plurality of modules, and that memory 120 may exist at multiple levels, from high speed registers and caches to lower speed but larger DRAM chips.

In one embodiment, the sensor station 110 may also include a timing device/circuit 130 and/or an energy source 140. In one embodiment, the timing device 130 may be a resonator, crystal, or oscillator configured to generate a timing signal for recording seismic data. In one embodiment, the timing device 130 may be configured to independently generate a clock signal for the seismic sensor station. In alternative embodiments, the timing device may be configured to receive an external clock signal from a master clock, and generate a clock signal for the seismic sensor station 100 based on the received external clock signal.

The energy source 140 may be configured to provide power to the sensors 110, memory 120, and other electronic circuits in the station 100. In one embodiment the energy source 140 may be a battery sufficiently large to provide power to the station 100 for the duration of a seismic survey. In an alternative embodiment, power may be externally provided to the sensor station 100, as will be described in greater detail below.

In one embodiment of the invention, the seismic sensor station 100 may include a depth and/or pressure sensors 150. The depth or pressure sensors 150 may be configured to determine a depth of the seismic sensor station during deployment and/or retrieval. In one embodiment, a threshold depth may be defined for switching the seismic sensor station on or off. For example, during deployment, the sensors, memory and other circuits of the seismic sensor station 100 may not be powered until a threshold depth (as measured by the depth/pressure sensors 150) is reached. Similarly, during retrieval, when a threshold depth is reached, one or more circuits of the seismic sensor station may be powered down. By selectively powering one or more circuits of the seismic sensor station 100, embodiments of the invention may conserve power and extend the life of the seismic sensors station during operations to record seismic data.

Figure 2:
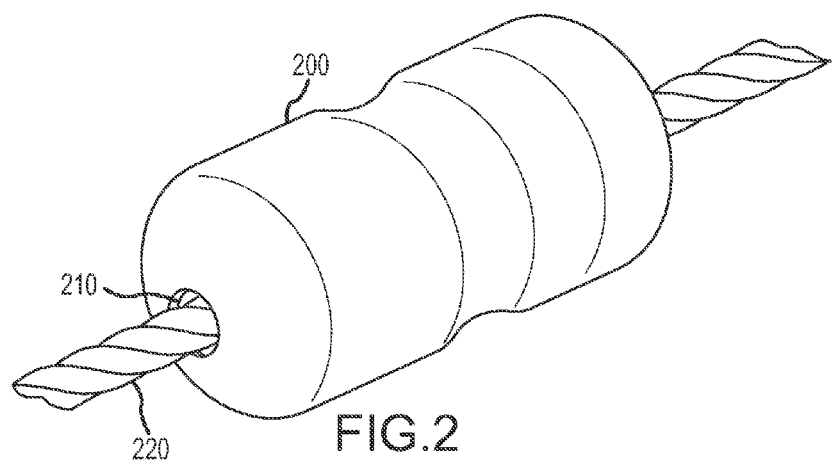
FIGS. 2-5 illustrate exemplary housings for a seismic sensor station, e.g., the sensor statin of FIG. 1, according to an embodiment of the invention.

FIGS. 2, 3, 4, and 5 illustrate exemplary housings for a seismic sensor station, e.g., the sensor statin 100 of FIG. 1, according to an embodiment of the invention. As illustrated in FIG. 2, in one embodiment, the seismic sensor station 100 may include a single integrated housing 200. All electronic components such as sensors, batteries, memory, and other circuitry may be contained within the housing 200. In one embodiment of the invention, the seismic sensor station may be configured to be deployed via a rope. Accordingly, the housing 200 may include a passage 210 defined therethrough for receiving a rope 220. The term rope is defined as any stress member configured to attach with the seismic sensor stations in order to facilitate deployment and retrieval of multiple seismic sensor stations. The rope may be made from any type of material, which may include synthetic materials, natural materials, metallic materials, or the like, or any combination thereof. In alternative embodiments, the sensor station may be deployed without a rope, e.g., via a remotely operated vehicle or simply by dropping the station into the water. In embodiments where a rope is not used, the passage 210 may be omitted.

Figure 3:
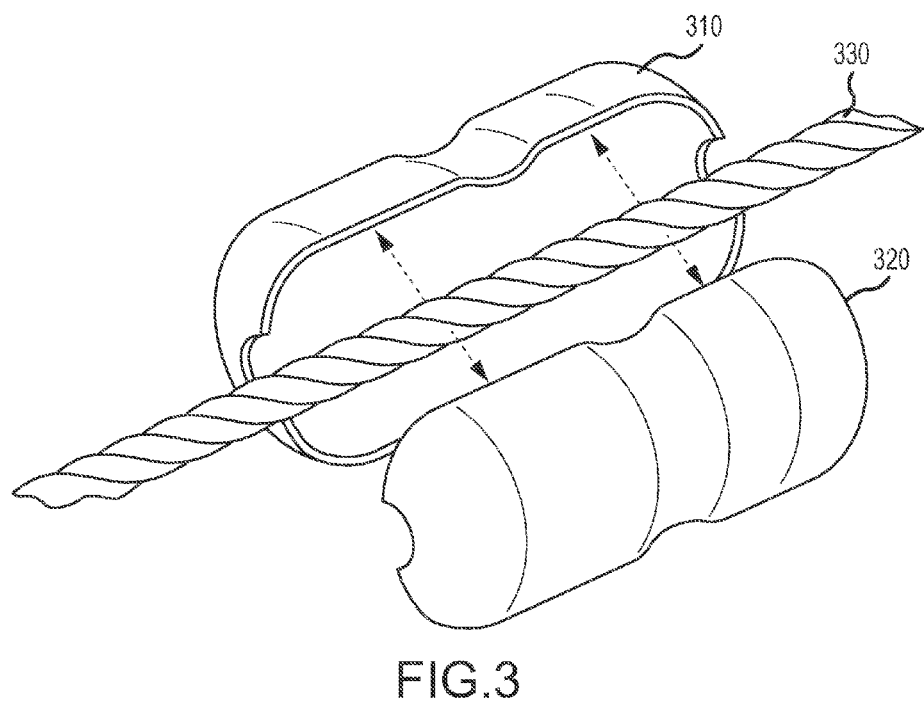

FIG. 3 illustrates an embodiment where two or more housings are configured to attach to one another to form a completed modular sensor station. For example, as shown in FIG. 3, a first module housing 310 of the modular station may be a sensor package (or module) comprising one or more seismic sensors. A second module housing 320 may be a memory and/or battery package (hereinafter referred to simply as the memory package or memory module).

The sensor module 310 may be configured to couple with the memory module 320 on a rope 330, thereby forming a modular station that is affixed to the rope 330. While the modular station is shown as comprising two components, in alternative embodiments, the modular station may include any number of a plurality of components. For example, the module 320 may be formed by coupling a distinct memory package to a distinct battery package. In general, embodiments of the invention are directed to a modular station that is formed by coupling two or more distinct housings to one another to form a complete station, wherein the coupling may also cause the complete station to become attached to a deployment rope.

In one embodiment, the modules 310 and 320, when connected, may be asymmetrical to one another about the rope 330. For example, the memory module 320 may be significantly larger than the sensor module 310. A larger housing may be utilized for the memory module 320 to allow greater space for including a sufficiently large battery and memory device. In one embodiment of the invention one or more of the components 310 and 320 may be hydrodynamically shaped to facilitate travel through the water column during deployment and/or retrieval operations. In one embodiment, the casings for the components 310 and 320 may also include features, e.g., studs, cleats, etc. (not shown in FIG. 3) to facilitate better coupling with the sea bed, thereby improving the quality of seismic data that is collected.

Coupling the sensor module 310 to the memory module 320 may involve clamping the sensor module 310 and the memory module 320 on to the rope 330 at a predetermined location. The clamping of the sensor module 310 and the memory module 320 may involve engaging one or more physical features on the housings of the modules 310 and 320 to each other and/or to the rope. Furthermore, clamping the components 310 and 320 may also electrically connect the respective components to each other. In an alternative embodiment, the components 310 and 320 may first be coupled together, and thereafter the assembled seismic node comprising the joined components 310 and 320 may be attached to the rope, e.g., via a passage that is defined by the connected housings 310 and 320.

Figure 4:
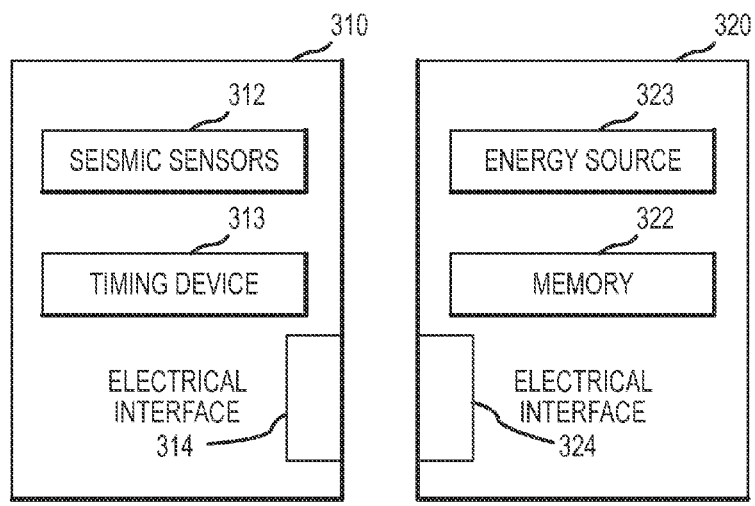

FIG. 4 is a block diagram illustrating exemplary components of the modules 310 and 320, according to an embodiment of the invention. As shown, the module 310 may include seismic sensors 312, which may correspond to the sensors 110 of FIG. 1. The module 310 may also include a timing device 313 which may correspond to the timing device 130 of FIG. 1. The sensor module 320 may include an energy source 323 and memory 322, which may correspond to the energy source 140 and memory 120 respectively in FIG. 1. The sensor modules 310 and 320 may include additional circuits and devices that are not shown in FIG. 4.

In one embodiment, the modules 310 and 320 may each include an interface to exchange/transfer seismic data recorded by one or more seismic sensors, clock signals, control signals for controlling one or more devices, and/or power. For example, the electrical interfaces 314 and 324 of modules 310 and 320 respectively in FIG. 4 may be configured to transfer seismic data from the sensors 312 to the memory 322, and power from the energy source 323 to the sensors 312 (and timing device 313). In one embodiment, physically coupling the housings of the components 310 and 320 may also establish an electrical connection between the interfaces 314 and 324. In one embodiment, the interfaces 314 and 324 may include connectors for coupling a data bus for transferring seismic data recorded by the sensors 312 to the memory 322. The interfaces 314 and 324 may also include connectors for a power bus configured to transfer power from the energy storage 323 to one or more components in the sensor package 310, e.g., the seismic sensors 312 and timing device 313. In an alternative embodiment, a common bus may be used to transfer power and data between the modules.

Embodiments of the invention are not limited to the specific arrangements of components in the modules 310 and 320 illustrated in FIG. 4. In alternative embodiments, any arrangement of components of a seismic sensor station in two or more connectable modules is contemplated herein.

Figure 5:
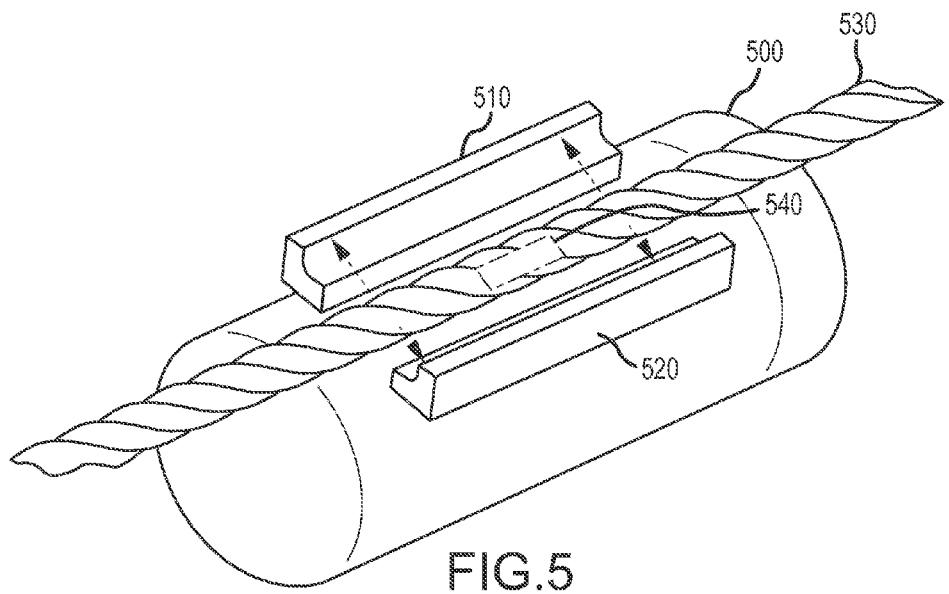

FIG. 5 illustrates yet another embodiment of the invention wherein a seismic sensor station 500 is equipped with clamping members 510 and 520 for coupling the seismic sensor station 500 to a rope 520. The seismic sensor station 500 may have a single integrated housing as shown in FIG. 2, or in alternative embodiments, the seismic sensor station 500 may be formed by coupling a plurality of housings as shown in FIG. 3.

In one embodiment of the invention, one or more components of the seismic sensor station may be integrated on to a deployment rope. For example, referring to FIG. 5, a component 540 may be integrated in the rope 530. In one embodiment, the component 540 may include one or more seismic sensors. Connecting the housing 500 to the rope 530 may result in a physical, electrical, and/or inductive connection being established between the component 540 and components within the housing 500.

Figure 6:
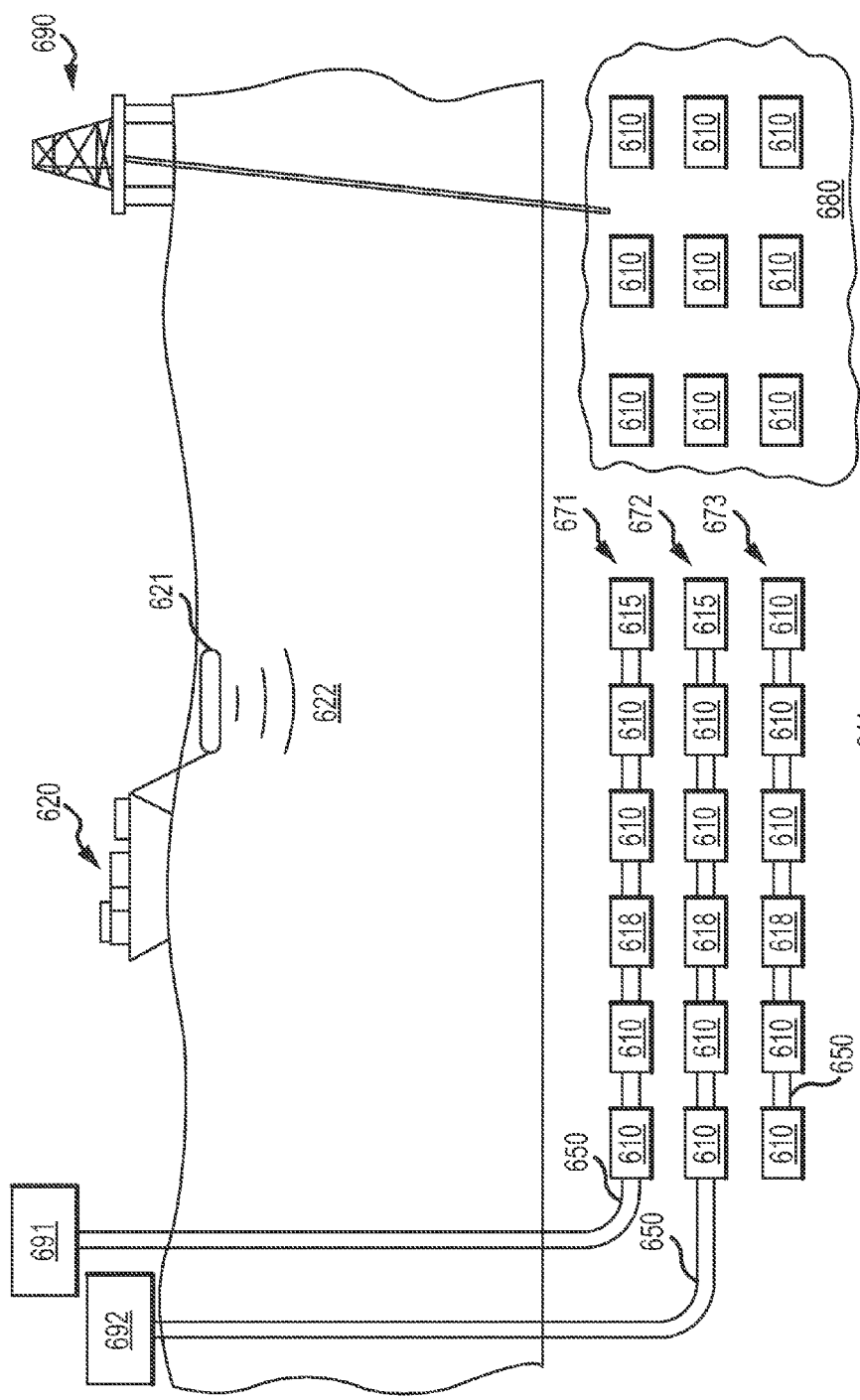
FIG. 6 illustrates an exemplary seismic survey according to an embodiment of the invention.

FIG. 6 illustrates an exemplary seismic survey according to an embodiment of the invention. A plurality of autonomous sensor stations 610 may be deployed on a seabed 611. While reference is made to a sea floor and seabed herein, embodiments of the invention are not limited to any particular type of body of water. Rather, embodiments of the invention may be used in any marine environment including oceans, lakes, rivers, etc. Accordingly, the use of the term sea, seabed, sea floor, and the like, hereinafter should be broadly understood to include all bodies of water.

As illustrated in FIG. 6, two or more of the sensor stations 610 may be deployed on the sea floor or bed via a respective rope or wire 650. In one embodiment, the rope 650 may be made from a synthetic material with a predefined specific density relative to the water in which it is immersed. In some embodiments, the rope 650 may be a passive rope, i.e., it may not include any electrical conductors. However, in alternative embodiments, the rope may include embedded conductors for transferring one or more of a clock signal, data signals, control signals and power.

In one embodiment, one or more seismic sensor stations 610 may be deployed to the sea floor 611 via any other means, e.g., via a remotely or autonomously operated vehicle (ROV or AUV), by dropping them from a deployment vessel, etc. In yet another embodiment, each autonomous sensor station 610 may be equipped with a propulsion system and programmed to navigate through the water column to and from predetermined locations on the sea floor. As can be seen in FIG. 6, deployment of the seismic sensor stations 610 without a rope may be advantageous in areas near obstructions such as the area 680 associated with an oil rig 690 in order to avoid the rope 650 from coming into contact with and damaging the obstruction components during deployment and/or retrieval.

In one embodiment, rope deployed seismic sensor stations may be coupled to a hub or buoy. For example, the rope segments 671 and 672 are shown coupled to respective hubs 691 and 692. While the hubs 691 and 692 are shown as floating buoys, in alternative embodiments, one or more of the hubs 691 and 692 may be placed on the sea floor, or may float at a predefined depth in the water column. In one embodiment, the hubs 691 and 692 may include a high precision clock. A clock signal from the high precision clock may be transferred to sensor stations 610 via conductors in the rope 650 to facilitate clock correction or to generate a clock signal at the sensor stations 610.

In some embodiments, the hubs 691 and 692 may be configured to transfer power, data, and/or control signals to the sensor stations 610. Accordingly, the hubs 691 and 692 may be equipped with power generation and or energy storage devices, and/or control logic for performing quality checks and implementing predefined operating protocols, and the like. In some embodiments, signals sent from the hubs may be used, for example, to recharge sensor station batteries, to perform quality/station health tests, to turn the stations on/off, etc. In some embodiments, the hub devices may be equipped with a global positioning satellite (GPS) device and/or a radio transmitter/receiver device in order to facilitate determining location of the hub and/or to facilitate communication with the hub device.

In embodiments where the rope 650 is configured to transfer signals, a tail termination device 615 may be provided at an end of the rope 650. A separate head termination device may also be provided in the hub device, wherein the sea water may be used to couple the head and tail termination devices. In some embodiments, the hub devices may be omitted. For example the rope segment 673 is shown without an associated hub device.

In one embodiment of the invention, a high precision clock may be included in each and every seismic sensor station 610. In alternative embodiments, a high precision clock signal may be provided via an external master clock to slave timing devices that are implemented in the seismic sensor stations. The master clock may be located on a hub device or in devices 618 that may be placed at predefined intervals along a rope 650. In one embodiment, the devices 618 may include only a high precision clock. In alternative embodiments, the devices 618 may include other components such as power sources. In yet another embodiment, the devices 618 may be a "super station", i.e., a device with all the components of a seismic sensor station 610, as well as a high precision clock that may be used to provide a clock signal to other nearby seismic sensor stations 610.

Referring again to FIG. 6, a source boat 620 may be configured to tow a seismic source 621 while conducting a seismic survey. In one embodiment, the seismic source 621 may be an air gun (or a plurality of air guns) configured to release a blast of compressed air into the water column towards the seabed 611. As shown in FIG. 6, the blast of compressed air generates seismic waves 622 which may travel down towards the seabed 611, and penetrate and/or reflect from sub-seabed surfaces. The reflections from the sub-surfaces may be recorded by the sensor stations 610 as seismic data, which may thereafter be processed to develop an image of the sub-surface layers. These images may be analyzed by geologists to identify areas likely to include hydrocarbons or other substances of interest.

In one embodiment of the invention, a plurality of source boats 620 may be simultaneously operated while acquiring seismic data. In embodiments where multiple source boats are used, the source boats may be configured to operate their respective sources according to a simultaneous source regime. For example, the sources on two or more source boats may be configured to emit seismic energy substantially simultaneously, or with a predefined delay such that there is at least some overlap in the duration of emission of seismic energy from two or more sources.

Figure 7:
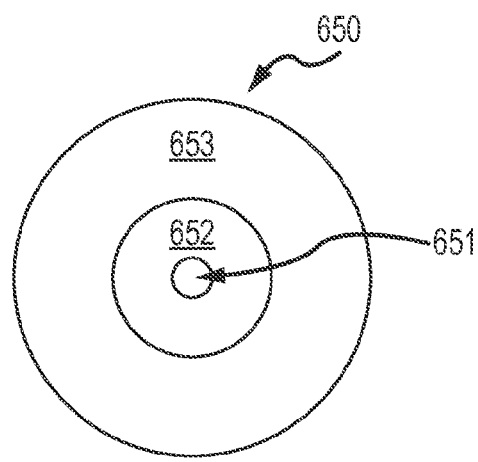
FIG. 7 illustrates a cross section of an exemplary cable according to an embodiment of the invention.

In one embodiment of the invention, the deployment rope 650 may include a single conductor configured to transfer a clock signal. The clock signal may be transferred from a hub device or from a device 618, as described above. FIG. 7 illustrates a cross section of an exemplary cable 650 according to an embodiment of the invention. As shown, the rope 650 may include a conducting wire 651 that is enclosed by an insulation layer 652. The insulation layer 652 may be enclosed by a strength member 653, e.g. a fiber or other synthetic material.

Figure 8:
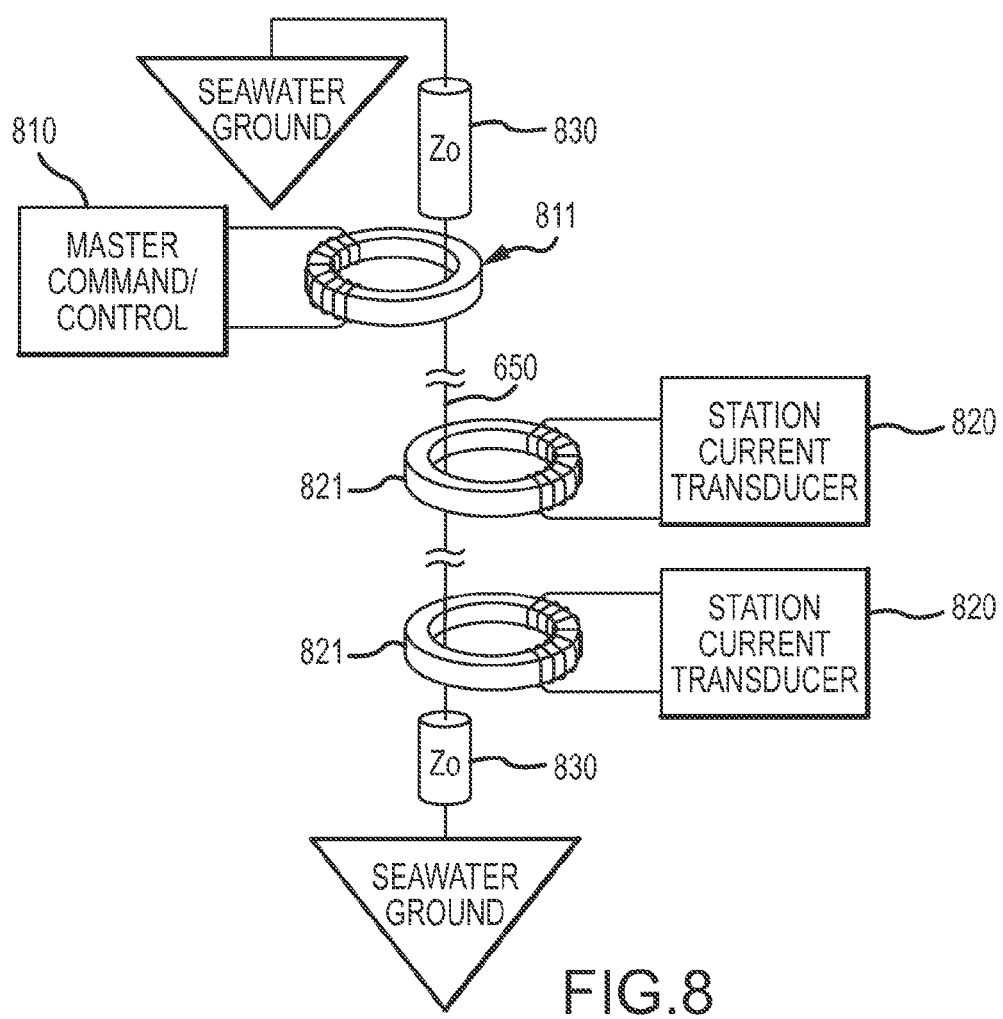
FIG. 8 illustrates a system for transmitting signals via a conductive rope.

In one embodiment of the invention, devices may be inductively coupled to a conductor in a rope such as the rope shown in FIG. 7. FIG. 8 illustrates a system for transmitting signals via a conductive rope 650. A master command and control device 810 may be configured to control a current transformer 811 in order to inductively generate a current signal in the conductive rope 650. In one embodiment, the master command and control device 810 may be located at a hub device or in a device 618 (see FIG. 8), and may be configured to generate a clock signal in the conductive rope 650.

The current signal in conductive rope 650 may be detected by the current transformers 821, which may inductively generate a signal to the station current transducers 820, thereby transferring the signal from the conductive rope to the sensor station. Impedances 830 may be included on the ends of the conductive rope 650 in order to match loads and suppress signal reflections which may create noise. As described earlier, the seawater may provide a means to connect the head and tail terminals of the conductive ropes.

Figure 9:
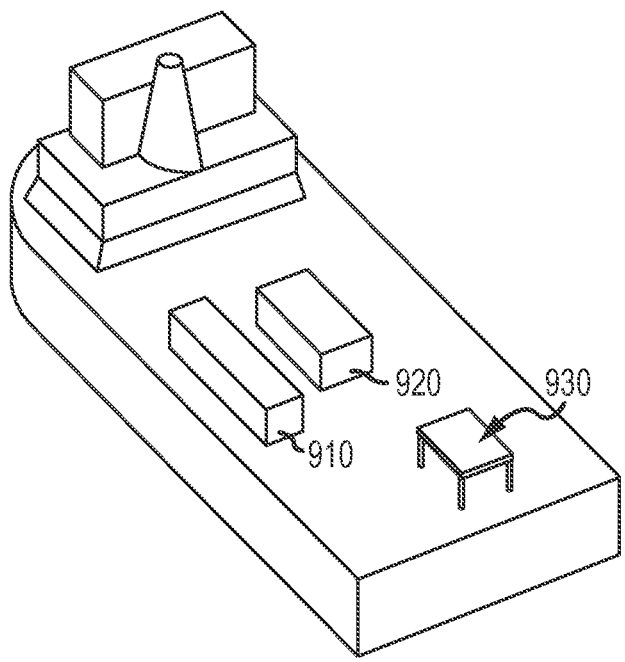
FIG. 9 illustrates an exemplary back deck of a sensor station deployment boat according to an embodiment of the invention.

FIG. 9 illustrates an exemplary back deck of a sensor station deployment boat according to an embodiment of the invention. The boat may be a configured to deploy and/or retrieve an ocean bottom sensor system via a rope. As shown, the back deck may include a station storage structure 910, a cable storage structure 920, and a staging area 930. In one embodiment, the station storage structure 910 may be a cargo container of any size configured to store one or more components of a seismic sensor station. The station storage structure may include arrangements for supplying power to recharge batteries and download seismic data from memory, and the like. In one embodiment, the station storage structure may include separate areas for one or more station components, e.g., a first area for storing station sensor modules and a second area for storing station memory modules. In one embodiment, the station storage structure may include arrangements for placing one or more carts, each containing a plurality of station modules therein. The carts may include an interface for battery recharging, data download, quality assurance, and the like. Station module carts are described in greater detail below.

The cable storage structure 920 may be a cargo container, a cable bin, a cable reel, or the like configured to store one or more cables that may be used to deploy seismic sensor stations. The staging area 930 may be used to couple one or more components of a modular sensor station to each other and/or to a rope prior to deployment. The staging area may also be used to decouple the sensor station from the rope and/or to decouple components of a modular sensor station during retrieval of sensor stations after a survey. In one embodiment, the staging area 930 may include components, e.g., machinery, tools, and the like, to facilitate deployment and retrieval of the seismic sensor stations, for example, rope de-tensioning devices, ramps or conduits for directing the cable, and the like.

Figure 10:
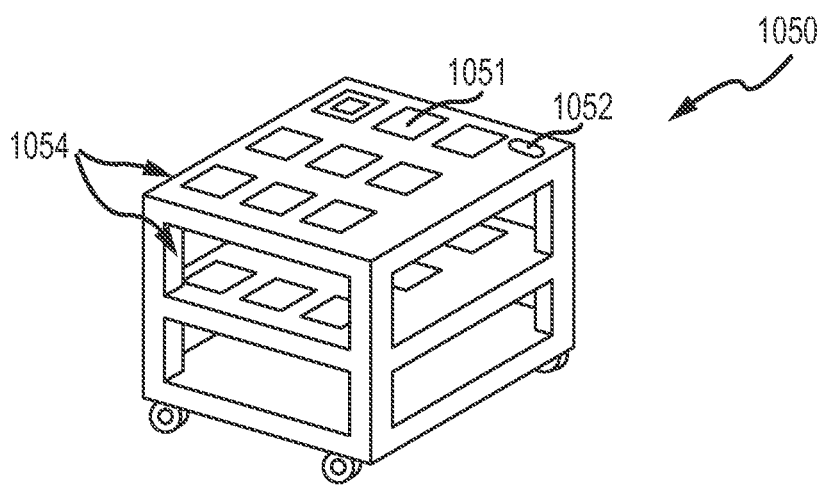
FIG. 10 illustrates an exemplary cart according to an embodiment of the invention.

As previously mentioned, the station storage structure 910 may be configured to house a plurality of carts, wherein each cart may contain a plurality of sensor station components. FIG. 10 illustrates an exemplary cart 1050 according to an embodiment of the invention. The cart 1050 may include a plurality of slots 1051 for receiving sensor station components. In one embodiment, each cart may include a plurality of vertically stacked slot trays 1054. Each cart may include either solely sensor modules, solely memory/battery modules, or a combination of sensor modules and memory/battery modules. Each slot may be electrically coupled to an interface 1052. The interface 1052 may be used to download seismic data from sensor modules, charge batteries in battery modules, perform quality assurance tests on components such as sensors, memory, battery, and the like.

Figure 11:
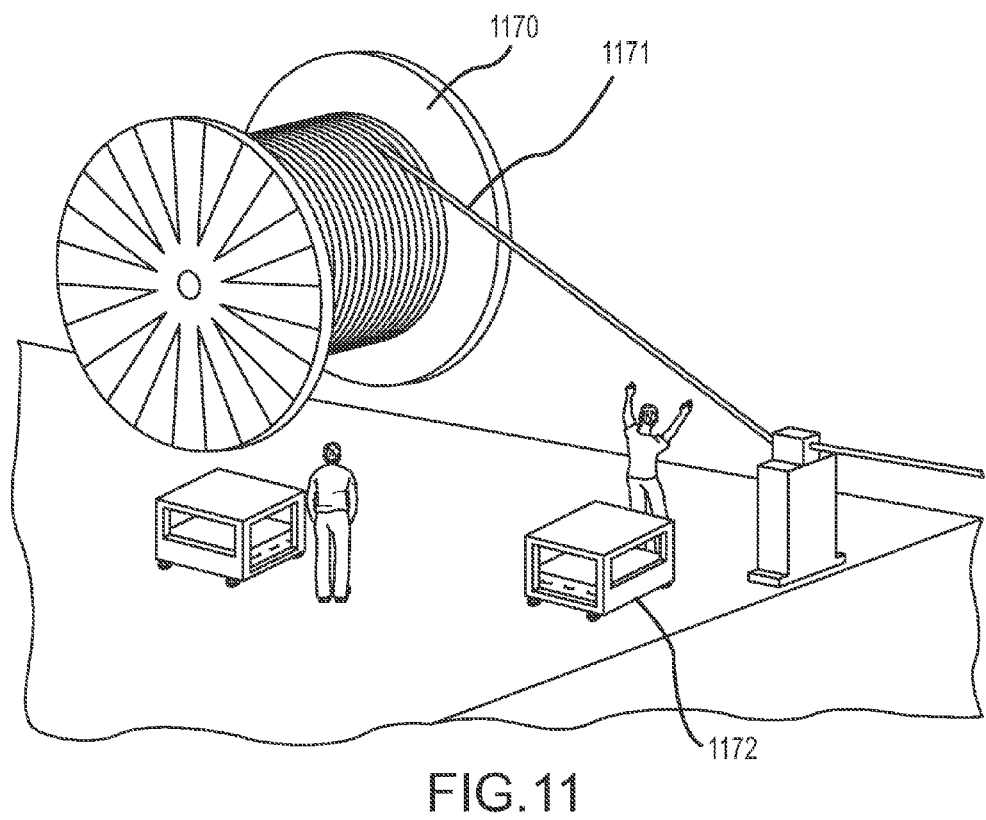
FIG. 11 illustrates a staging area on a back deck of a seismic boat according to an embodiment of the invention.

FIG. 11 illustrates a staging area on a back deck of a seismic boat according to an embodiment of the invention. As shown, a cable reel 1170 may be used to deploy a cable into the water. In the embodiment shown in FIG. 11, a first module 1171 of a modular seismic sensor station may be permanently attached to the rope. The rope may be projected to the staging area from the cable reel 1170, where a second module 1172 may be coupled to the first module 1171 prior to deployment. In one embodiment, the first module 1171 may be a sensor module and the second module 372 may be a memory module.

The second module 1172 may be retrieved from a storage structure (e.g., the structure 910 of FIG. 9) via a cart 1050 (see also FIG. 10). While a permanently attached first module 1171 is illustrated in FIG. 11, in alternative embodiments, the rope may not contain any permanently attached components. In such embodiments, sensor station components may be retrieved from a storage area via carts 1150. The station components may be coupled to each other and to the rope at the staging area prior to deployment. In an alternative embodiment, the station components may be coupled to each other at another location, e.g., in the storage structure and brought to the staging area via one or more carts. Cart paths or tracks may be provided to safely transfer the carts to the staging area. Thereafter, the fully assembled stations may be coupled to the rope at the storage area prior to deployment.

During retrieval, cables comprising seismic sensor stations may be received in the staging area. At the staging area, the sensor stations may be decoupled from the rope, individual modules of the sensor station may be decoupled and loaded on to carts and transferred to respective storage locations. The cable being retrieved may be transferred to a cable storage area/structure as it is being retrieved.

Figure 12:
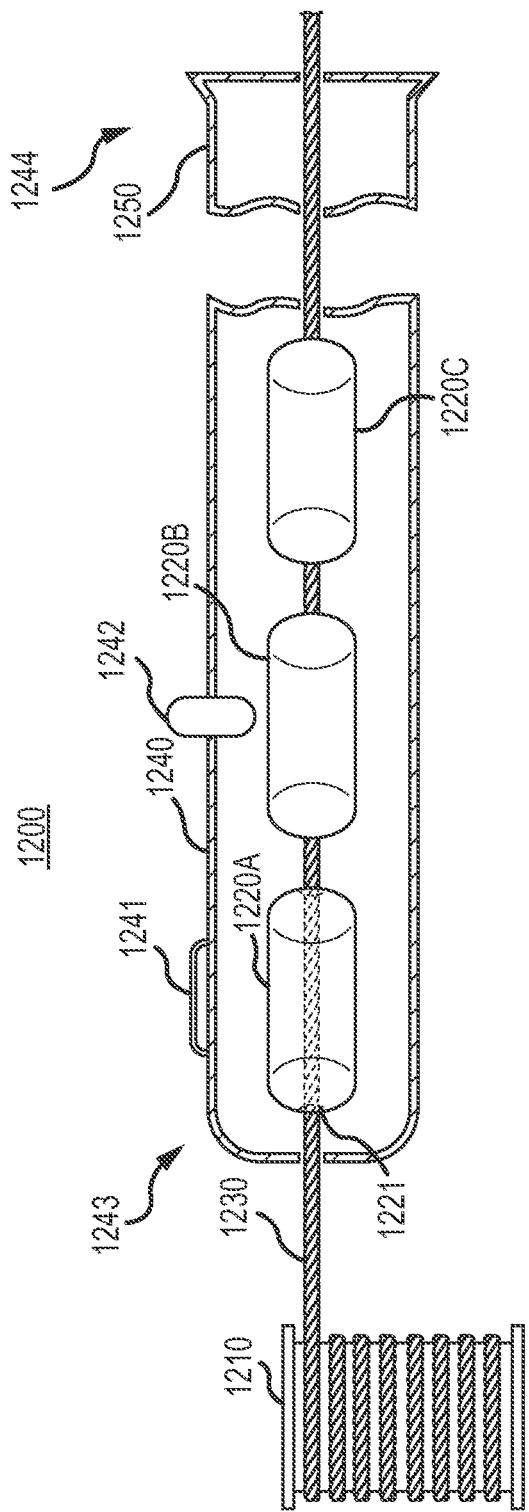
FIG. 12 illustrates an exemplary automated system for deploying ocean bottom seismic sensor stations according to an embodiment of the invention.

FIG. 12 illustrates an exemplary automated system 1200 for deploying ocean bottom seismic sensor stations according to an embodiment of the invention. As illustrated, the system 1200 may include a cable storage device 1210, a plurality of ocean bottom sensor stations 920A-C, and a rope 1230. In one embodiment, the cable storage device 1210 may be a winch. Alternatively, the cable storage device 1210 may be a cable bin, or any other structure configured to store cable. The cable 1230 may be made from a synthetic material with a predefined buoyancy relative to water. In some embodiments, the cable 1230 may be a conductive cable as described hereinabove.

The plurality of ocean bottom seismic sensor stations 1220 may be stored in a container 1240. In one embodiment, the container 1240 may be a tube made from any combination of one or more of plastic, metal, etc. The container 1240 may comprise a first end 1243, which may include a recess for receiving the rope 1230 from the cable storage device 1210. The container 1240 may also include a second end 1244, from which the seismic sensor stations may be deployed and/or retrieved.

As illustrated in FIG. 12, the plurality of seismic sensor stations 1220 may be loaded on to the rope 1230. For example, in one embodiment, the seismic sensor stations 1220 may include a passage 1221 by means of which the sensor stations 1220 may be strung on to the rope 1230. In alternative embodiments, the sensor stations 1220 may include a connector, for example, a loop connector, for receiving the rope 1230.

In one embodiment of the invention, the container 1240 may include means for coupling with the sensor stations 1240 for data download, battery charging, and the like. For example, in one embodiment, an induction device 1241 may be provided proximate a seismic sensor station 1220 (station 1220A in FIG. 12). In an alternative embodiment, a connector 1242 may be provided to directly electrically couple with a sensor station (station 1220B in FIG. 12). In alternative embodiments, a plurality of connectors 1242 may form a transfer bus configured to connect with each station in the container and access the stations for battery charging, data download, and the like. In yet another embodiment, the sensor station may be configured to wirelessly communicate with an on board computer to transfer collected seismic data.

Deployment of the seismic sensor system 1200 may begin by initiating deployment of the rope 1230 in the water. In one embodiment, during deployment, the rope 1230 may be configured to move through the passage 1221 without substantially moving the sensor stations 1220 from their position in the container 1240. At predetermined intervals of time or after a predetermined length of rope has been deployed, one of the seismic sensor stations 1220 may be configured to grip the rope and be deployed from the container 1240. For example, in FIG. 12, the seismic sensor station 1220C may be the first to be deployed, followed by station 1220B, and then station 1220A.

In one embodiment of the invention, deployment of the seismic sensor stations along the rope 1230 may be based on a predefined spacing between sensor stations when deployed. For example, a winch controller may be configured to determine a number of turns of the winch that have occurred during deployment. The number of turns of the winch may determine the length of rope that has been deployed. Based on the length of rope that has been deployed or the length of rope that has been deployed since deployment of the last seismic sensor station, a signal may be sent to the next seismic sensor station to grip the rope. For instance, a wind controller may determine a number of turns of the winch since the deployment of station 1220C. When the number of turns of the winch controller reaches a predefined number associated with a predefined length of rope deployed since the deployment of station 1220C, a signal may be sent to the station 1220B to grip the rope. The signals to the seismic sensor stations to grip the rope may be sent inductively via the induction device 1241, via a connector 1242, or via a wireless command.

During retrieval of the seismic sensor system 1200, the winch 1210 may be configured to reel in the rope 1230 through the container 1240. As the seismic sensor stations enter the container 1240 during retrieval, they may be configured to release the rope 1230, thereby coming to rest at a desired location in the container. In one embodiment, the stations 1220 may be configured to release the rope upon detecting an inductive or electrical coupling, e.g., via the inductive element 1241 or electrical connector 1242. In an alternative embodiment, the stations 1220 may include sensors to determine proximity to or contact with another station 1220. Therefore, when a seismic sensor station reaches within a predefined distance from another seismic sensor station, or if the seismic sensor station detects contact with another seismic sensor station, the rope 1230 may be released.

While the seismic sensor system 1200 is shown comprising a single winch 1210, single rope 1230, and three seismic sensor stations, in alternative embodiments, the seismic sensor system may include any number of winches configured to deploy any number of ropes from any number of containers 1240, which may include any number of seismic sensor stations.

Figure 13A:
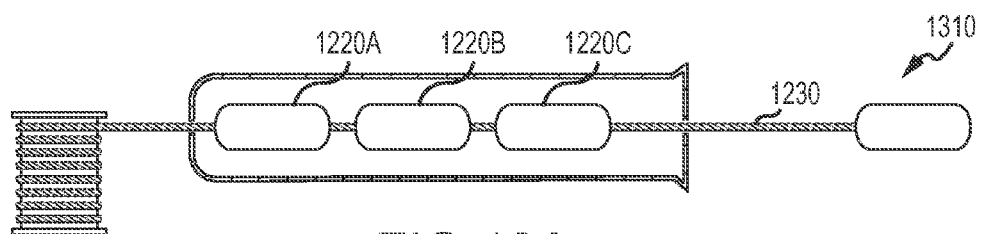
FIGS. 13A-D illustrate exemplary deployment of an ocean bottom seismic sensor system according to an embodiment of the invention.
Figure 13B:
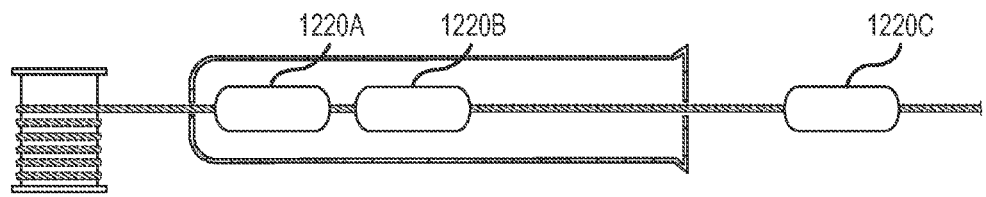

FIGS. 13A-D illustrate exemplary deployment of an ocean bottom seismic sensor system according to an embodiment of the invention. As illustrated, deployment may begin by deploying rope 1230 in the water. The rope 1230 may include an anchor 1310. FIG. 13B illustrates deployment of a first sensor station 920C. The deployment may be initiated by a deployment controller (not shown) which may cause the station 1220C to grip the rope 1230.

Figure 13C:
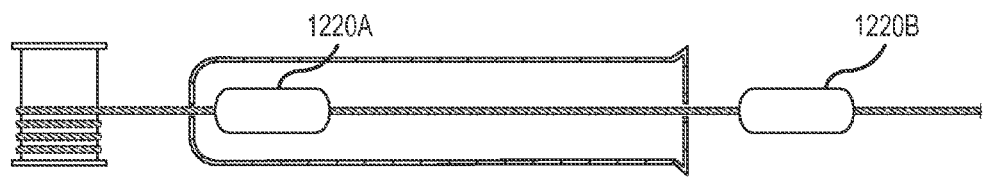
Figure 13D:
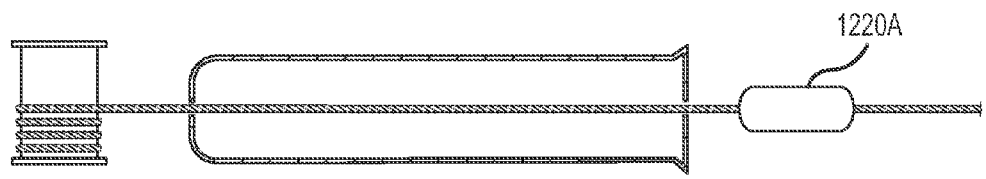

After deployment of the first station 1220C, the deployment controller may determine a length of rope that has been deployed since the deployment of the station 1220C. When a desired length of deployed rope is achieved, the deployment controller may signal the station 1220B to grip the rope and deploy, as shown in FIG. 13C. After deployment of station 1220B, the deployment controller may similarly deploy the station 1220A after a desired amount of rope has been deployed, as shown in FIG. 13D.

In one embodiment of the invention, the deployment controller may be configured to equally space the stations 1220 along the rope during deployment. However, in alternative embodiments, the deployment controller may taper or otherwise vary the distances between stations on the rope. For example, referring to FIG. 13B, the deployment controller may cause the stations 1220C and 1220B to grip the rope such that there is a distance of 25 meters between them. Thereafter, the deployment controller may signal the station 1220A to grip the rope such that there is distance of 50 meters between the station 1220A and 1220B.

Figure 13E:
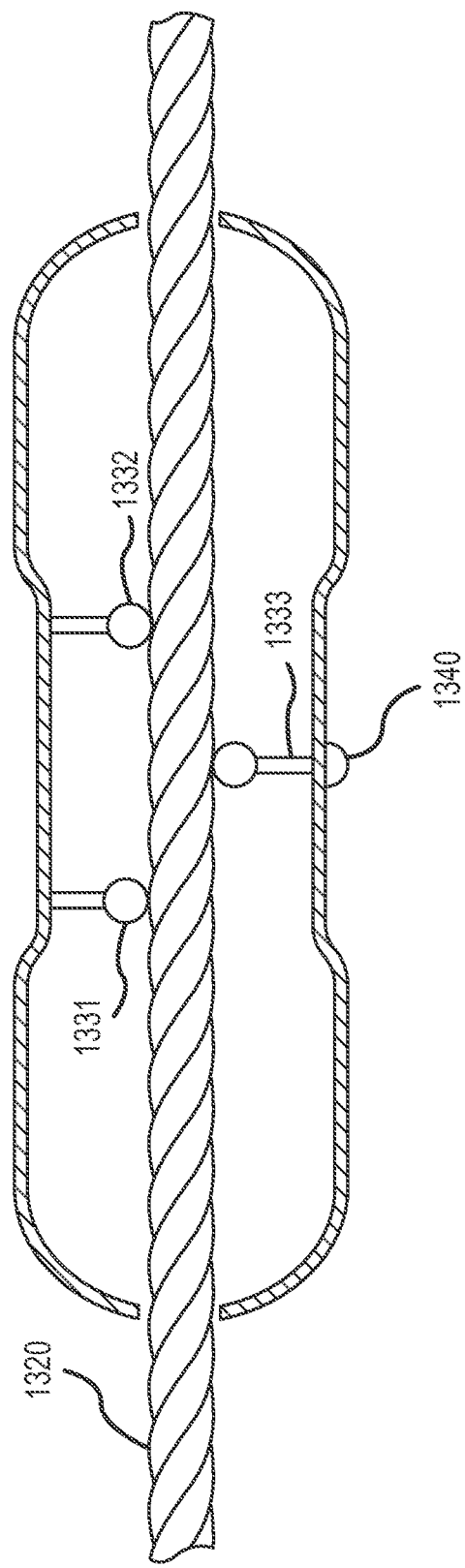

FIGS. 13E and 13F illustrate a method for coupling a sensor station to a rope, according to an embodiment of the invention. An example of a coupling mechanism comprising the elements 1331, 1332, and 1333 is also shown. In the embodiment of FIG. 13E, the elements 1331, 1332, and 1333 are positioned such that the rope 1320 is not gripped by the station, and therefore is free to be deployed through the station. FIG. 13F illustrates a second configuration of the coupling mechanism in which the elements 1331, 1332, and 1333 are positioned such that the rope 1320 is gripped, thereby causing the station to become attached to the rope.

In one embodiment of the invention, a connector 1340 may be provided. As illustrated in FIG. 13E, when the station is not attached to the rope, the connector 1340 is configured to protrude from the station, which may cause an electrical contact with elements, e.g. the connector 1242 of FIG. 12, that facilitate access to the station for data download, battery charging and the like. In the configuration of FIG. 13F, the connector may be retracted into the station when the station is attached to the rope and deployed.

Figure 14:
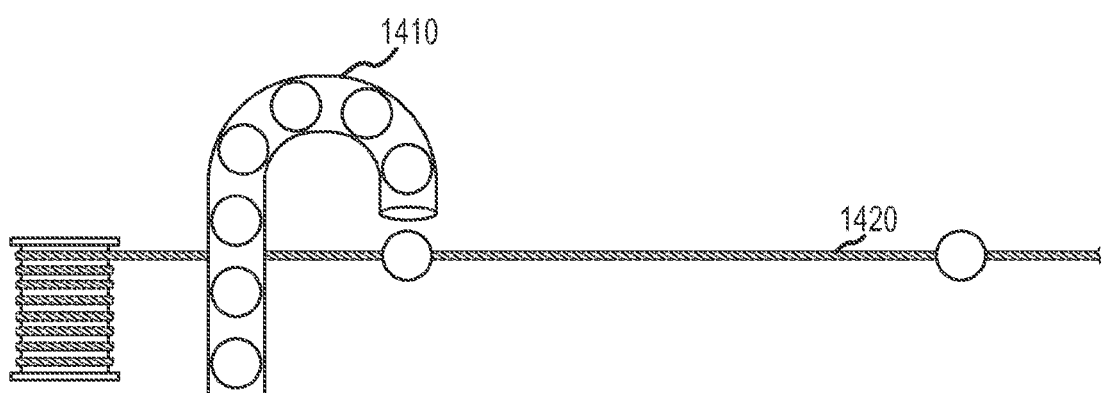
FIG. 14 illustrates yet another system for deploying seismic sensor stations according to an embodiment of the invention.

FIG. 14 illustrates yet another system 1400 for deploying seismic sensor stations according to an embodiment of the invention. The system 1400 may be an automated system wherein a station magazine 1410 may be configured to store a plurality of sensor stations. The station magazine 1410 may be configured to eject seismic sensor stations contained therein in a predefined or controlled manner towards a deployment rope 1420. The seismic sensor stations 1410 may grip the rope upon contact, and deploy with the rope. Gripping may be accomplished, for example, using rope gripping members as shown in FIG. 5.

Figure 15:
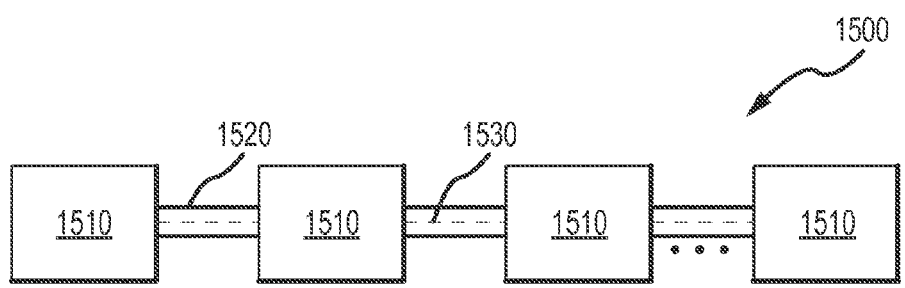
FIG. 15 illustrates another embodiment of an ocean bottom seismic sensor station system, according to an embodiment of the invention.

FIG. 15 illustrates another embodiment of an ocean bottom seismic sensor station system, according to an embodiment of the invention. As shown in FIG. 15, the seismic sensor station system may include a sensor segment 1500 comprising a plurality of seismic sensor stations 1510 that are coupled to a rope 1520. The seismic sensor stations 1510 may correspond to the seismic sensor stations illustrated in FIGS. 1-5, and may include similar components. In one embodiment, the seismic sensor stations 1510 may be modular seismic sensor stations comprising physically distinct modules that are coupled to each other. In alternative embodiments, the seismic sensor stations 1510 may be formed by including any combination of seismic sensors, memory, energy source, and/or clock in a single housing.

In one embodiment of the invention, the seismic sensor stations 1510 may be electrically coupled to each over via a link 1530 that may be integrated in the rope 1520. The link 1530 may transfer power, data, instructions, and the like to and/or from the sensor stations 1510 of the sensor segment 1500. In one embodiment, the link 1530 may include a plurality of transmission lines. For example, a first plurality of transmission lines may be configured to transfer data to and from the sensor stations 1510, a second plurality of data lines may be configured to transfer instructions to and from the sensor stations 1510, and a third one or more transmission lines may transfer power to and from sensor stations 1510. In alternative embodiments, the same set of transmission line or lines may be used to transfer one or more of seismic data, instructions, and/or power. Moreover, while a single link 1530 is referred to herein, in alternative embodiments, a plurality of links may be included to transfer seismic data, instructions, and power to and from respective sensor stations 1510 of the segment 1500.

In one embodiment of the invention, the link 1530 may not be utilized when the sensor segment 1500 is deployed during a seismic survey. When a survey is being conducted, each seismic sensor station 1510 may collect its own respective seismic data and store the seismic data in local memory. At the conclusion of the survey, the sensor segment 1500 may be recovered from a survey location. After recovery, the link 1530 may be used to recover seismic data in the seismic sensor stations 1510 via the link. In one embodiment, the link 1530 may be utilized to transfer a timing signal from a hub device or from a "super station" device to other stations during a survey, and after completion of the survey, the link may be used to access the node for data download, charging, quality checks, etc.

Figure 16:
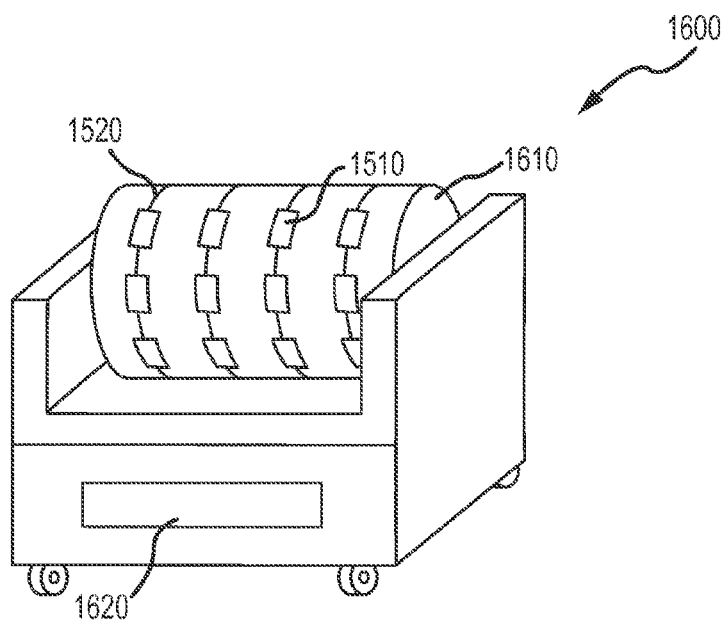
FIG. 16 illustrates an exemplary cart according to an embodiment of the invention.

In one embodiment of the invention, one or more rope segments may be stored on a reel cart while in transport on the back deck of a seismic vessel. FIG. 16 illustrates an exemplary cart 1600 according to an embodiment of the invention. As illustrated, the cart 1600 may include a reel 1610 and an interface 1620. When reeled on to the reel 1610, the sensor stations 1510 may be electrically coupled to the interface 1620 via a link (e.g., the link 1530 of FIG. 15). The interface 1620 may then be used to charge batteries, download seismic data, perform quality assurance tests, and the like, on the sensor stations 1510 via the link.

Figure 17:
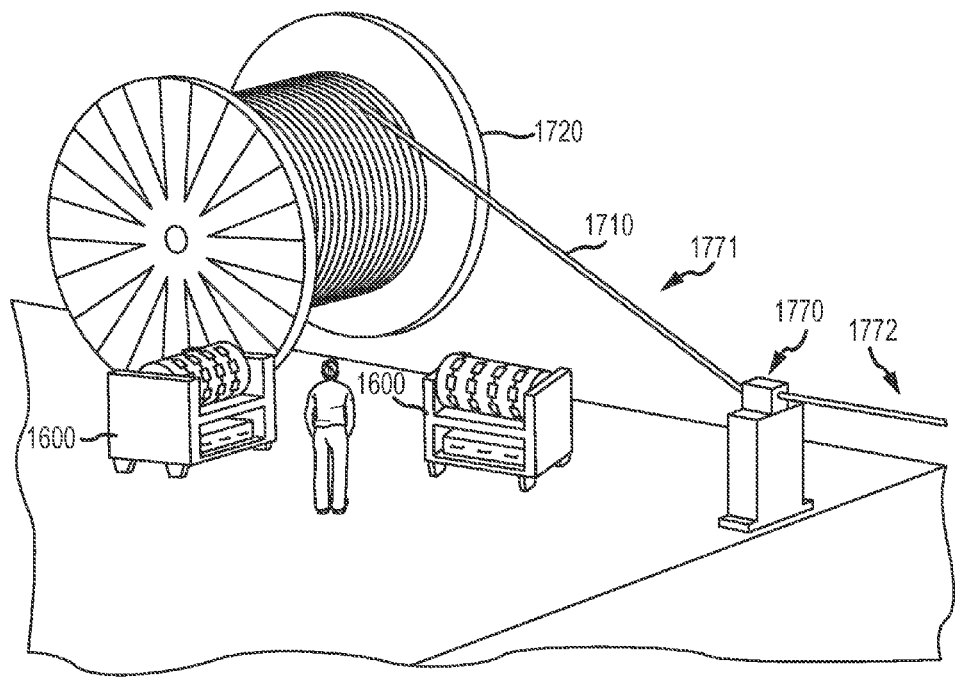
FIG. 17 illustrates deployment/retrieval of a sensor rope segment according to an embodiment of the invention.

A plurality of reel carts, each containing one or more sensor segments may be stored in a sensor station storage area (See item 910 in FIG. 9) of a seismic vessel back deck. During deployment and/or retrieval, the reel carts may be transported to and/or from the sensor station storage area to a working area via a cart path, cart tracks or the like. FIG. 17 illustrates deployment/retrieval of a sensor rope segment according to an embodiment of the invention. As illustrated, reel carts 1500 may be brought to a working area of a back deck of a seismic vessel. Also shown is a stress member/cable 1710 that is projected from a cable reel 1720 to the working area. In one embodiment, the sensor cable segment may be unreeled from a cart 1600 and coupled to the stress cable 1710 at one or more locations prior to deployment.

Figure 18:
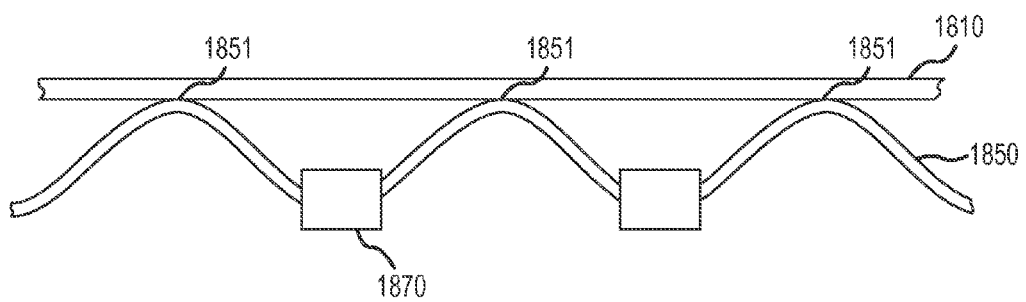
FIG. 18 illustrates an exemplary method of coupling a sensor cable segment comprising a plurality of seismic sensor stations to a stress cable.

FIG. 18 illustrates an exemplary method of coupling a sensor cable segment 1850 comprising a plurality of seismic sensor stations 1870 to a stress cable 1810. As illustrated, the cable segment 1850 may be coupled to the stress cable 1810 at coupling points 1851 in a manner that allows some slack in the cable segment 1850 relative to the stress cable 1810. One or more seismic sensor stations 1870 may be present on the sensor cable segment 1850 between two coupling points 1851.

During retrieval, the stress cable 1810 may be reeled on to the working area of the seismic vessel and loaded on to the reel 1820. At the working area, the seismic cable segments may be detached from the stress cable 1810 and loaded on carts 1600 for storage.

FIG. 17 also illustrates a detensioning and/or channeling device 1770. The device 1770 may be a pinch sheave and/or conduit configured to direct the cable into the water, and maintain different levels of tension in on a first side 1771 of the device 1771 and a second side 1772. In one embodiment, the tension on the first side 1771 may be significantly lower than the tension on the second side 1772.

In an alternative embodiment of the invention, the stress cable 1710 may be omitted and the seismic sensor cable segments may be directly deployed in the water. In such embodiments, a plurality of reel carts 1600 may be brought to the working area, and two or more sensor cable segments may be coupled to one another prior to deployment.

Figure 19:
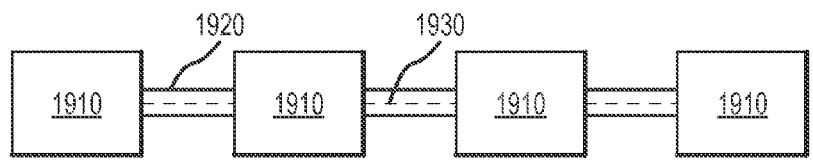
FIG. 19 illustrates an ocean bottom seismic sensor system according to another embodiment of the invention.

FIG. 19 illustrates an ocean bottom seismic sensor system 1900 according to another embodiment of the invention. As illustrated, the sensor system 1900 may include a plurality of electrically coupled locations 1910 that are coupled to a rope 1920. The locations 1910 may be electrically coupled to each other via a link system 1930 that may be integrated in the rope 1920. The link 1930 may transfer any one or more of power, data, instructions, and the like to and/or from the locations 1910 of the sensor system 1900.

In one embodiment, the link 1930 may include a plurality of transmission lines. For example, a first plurality of transmission lines may be configured to transfer data to and from one or more of the locations 1910, a second plurality of data lines may be configured to transfer instructions to and from one or more of the locations 1910, and a third one or more transmission lines may transfer power to and from one or more of the locations 1910. In alternative embodiments, the same set of transmission line or lines may be used to transfer one or more of seismic data, instructions, and/or power. Moreover, while a single link 1930 is referred to herein, in alternative embodiments, a plurality of links may be included to transfer one or more of seismic data, instructions, and power to and from one or more of the locations 1910 of the system 1900.

Figure 20A:
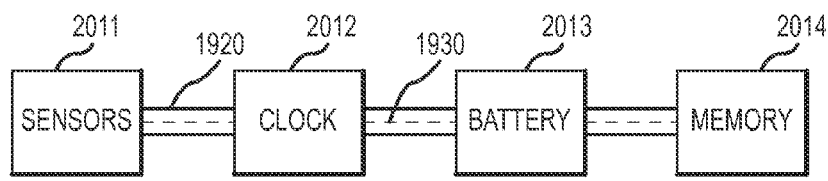
FIGS. 20A-C illustrate exemplary arrangements of components at the locations of a distributed sensor system according to an embodiment of the invention.
Figure 20B:
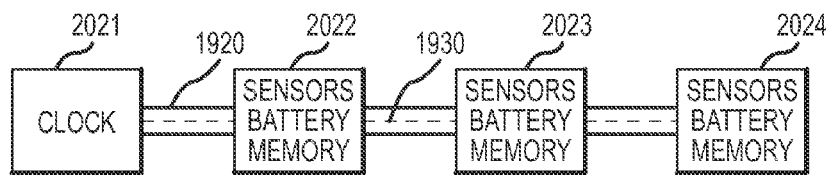
Figure 20C:
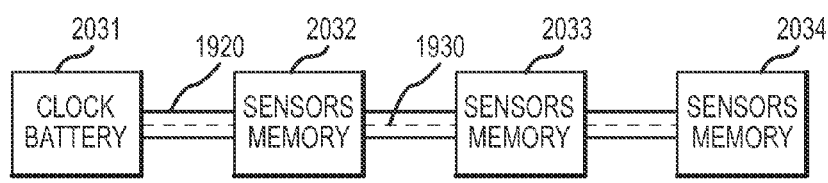

In one embodiment, the system 1900 may be a distributed system, wherein each location 1910 may be configured to house any one or more of seismic sensors, a clock, memory, and/or battery. FIGS. 20A-C illustrate exemplary arrangements of components at the locations 1910 of a distributed sensor system according to an embodiment of the invention. In FIG. 20A, seismic sensors may be placed at location 2011, a clock may be placed at location 2012, a battery may be placed at location 2013, and a memory device may be placed at location 2014. Seismic data recorded by the sensors at location 2011 may be transferred to the memory 2014 via the link 1930. A clock signal may be distributed to the memory device, the sensors and battery from the clock at location 2012 via the link 1930. Furthermore, power from the battery at location 2013 may be distributed via the link to the clock, sensors, and memory.

FIG. 20B illustrates an embodiment wherein a clock is placed at a location 2021, and sensors, batteries and memory devices are placed at each of locations 2022, 2023, and 2024. The clock signal may be distributed from the clock device at location 2021 to the sensors, memories, and batteries at locations 2022, 2023 and 2024 via the link 1930.

FIG. 20C illustrates yet another embodiment, wherein the clock and battery are placed at a location 2031 and sensors and memory at placed at each of locations 2032, 2033, and 2034. The link 1930 may therefore be used to transfer a clock signal and power from the location 2031 to the locations 2032, 2033, and 2034.

The link 1930 in FIGS. 19 and 20A-C may also be used to recover seismic data from memory devices and to charge battery devices. For example, in one embodiment the sensor system illustrated in FIGS. 19 and 20A-C may be reeled on to a reel cart such as the reel cart 1600 illustrated in FIG. 16. The link 1930 may be configured to electrically couple to the interface 1620, thereby allowing access to the devices in the seismic sensor system for battery charging, data download, and other quality assurance tasks.

While FIGS. 19 and 20A-C illustrate a seismic sensor system with four locations, in alternative embodiments, the seismic sensor system may include any number of locations. Furthermore, embodiments of the invention are not limited to the specific arrangement of devices as shown in FIGS. 20A-C. In general, embodiments of the invention are intended to include any arrangement of one or more of sensors, clocks, energy storage devices, and memory devices at each location in the seismic sensor system, wherein a link system is used to either transfer power, clock signal, and/or seismic data between two or more locations.

Deployment and retrieval of the seismic sensor system as illustrated in FIGS. 19 and 20A-C may be performed in a manner similar to that depicted and described with respect to FIGS. 17 and 18. Alternatively, two or more of the seismic sensor systems may be coupled to each other and directly deployed in the water without a stress cable.

Figure 21:
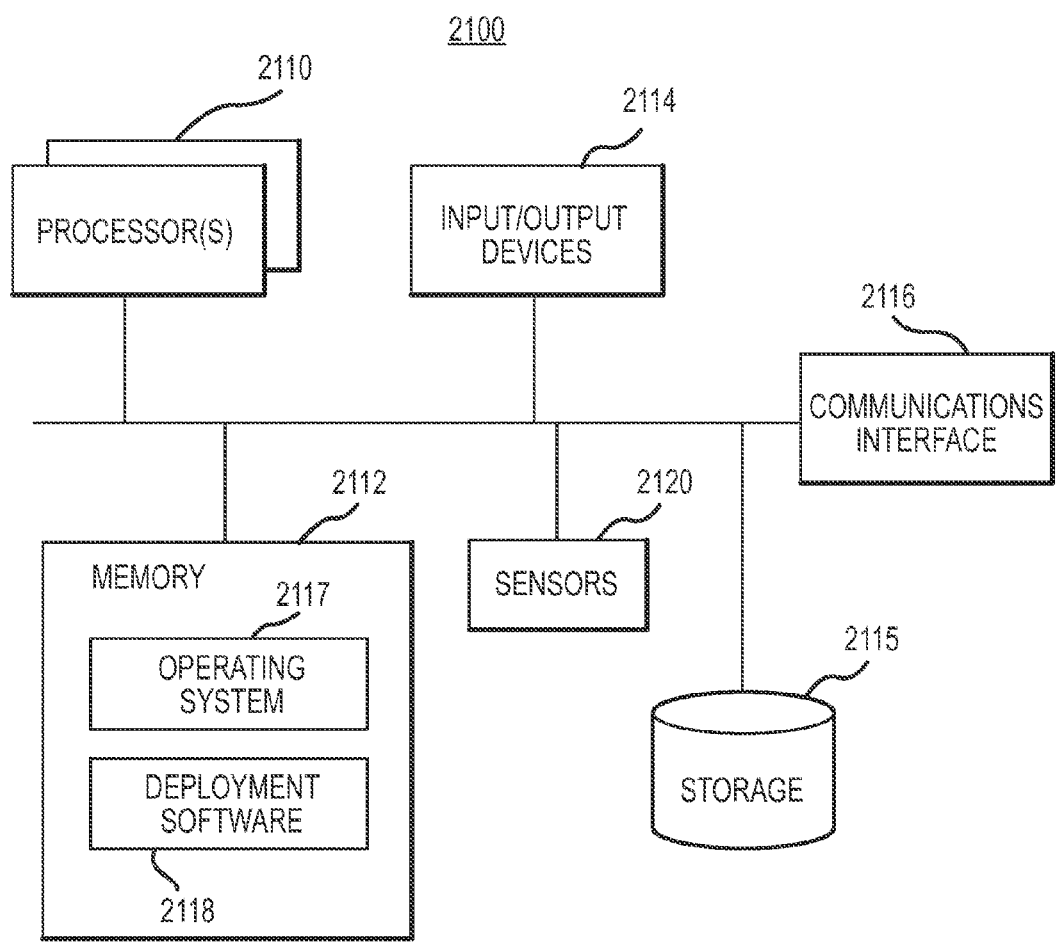
FIG. 21 is an exemplary functional diagram of a deployment control system according to an embodiment of the invention.

FIG. 21 is an exemplary functional diagram of a deployment control system 2100 according to an embodiment of the invention. In one embodiment, the control system 2100 may be provided on a seismic vessel. The control system may be configured to determine deployment of seismic sensor stations from a container, as described hereinabove. As illustrated in FIG. 21, the control system 2100 may include one or more processors 2111, a memory 2112, input/output devices 2114, storage 2115, and a communications interface 2116.

The input/output devices 2114 may include input devices such as a mouse, keyboard, touchscreens, and the like, and output devices such as CRT monitors, LCD displays, tablet computers, and the like. Storage device 2115 stores application programs and data for use by the control system 2100. Typical storage devices include hard-disk drives, flash memory devices, optical media, network and virtual storage devices, and the like. The communications interface 2116 may connect the control system 2100 to any kind of data communications network, including either wired networks, wireless networks, or a combination thereof. In one embodiment, the communications interface may be used to send data, commands, and the like to one or more seismic sensor stations in a container.

The sensors 2120 may be configured to determine a length of cable that has been deployed. In one embodiment, the sensors 2120 may include winch sensors configured to determine a number of turns of a winch that have occurred during deployment. The number of turns of the winch at any particular time may determine a length of cable that has been deployed.

The memory 2112 is preferably a random access memory sufficiently large to hold the necessary programming and data structures of the invention. While memory 2112 is shown as a single entity, it should be understood that memory 2112 may in fact comprise a plurality of modules, and that memory 2112 may exist at multiple levels, from high speed registers and caches to lower speed but larger DRAM chips.

Illustratively, the memory 2112 contains an operating system 2117. Well known examples of operating systems include the Windows® operating system, distributions of the Linux® operating system, and IBM's AIX and OS/2® operating systems, among others. More generally, any operating system supporting the functions disclosed herein may be used.

Memory 2112 is also shown containing a deployment program 2118 which, when executed by the processor 2111, provides support for deploying seismic sensor stations according to any of the methods described hereinabove. For example, the deployment program may determine a length of rope that has been deployed since the deployment of the most recent seismic sensor station. When a desired amount of rope has been deployed the deployment program may command a next seismic sensor station to grip the rope and deploy.

In one embodiment of the invention, each seismic sensor station may be equipped with an identifying device such as, for example, radio frequency identification (RFID). During deployment, the deployment program may be configured to determine an order of deployment of the seismic sensors stations based on the identifying mechanism. After retrieval of the seismic sensor stations after completion of acquisition, the identification mechanism may be used to confirm that the order of retrieval corresponds to the order of deployment. The deployment program may also be configured to assemble the data from various seismic sensor stations according to the order of deployment such that the extracted seismic data from the various seismic sensor stations is ordered according to the order of deployment of the nodes. Such ordering may be advantageous as the need for additional data reordering steps during processing of the seismic data may be obviated.

While the foregoing is directed to embodiments of the present invention, other and further embodiments of the invention may be devised without departing from the basic scope thereof, and the scope thereof is determined by the claims that follow.

What is claimed is:

1. A seismic data collection system, comprising:
   at least a first housing and a second housing, wherein the first housing is configured to detachably couple to the second housing; and
   a plurality of components, comprising:
   one or more seismic sensors;
   a clock;
   an electrical interface; and
   memory,
   wherein each of the plurality of components is arranged in one of the first housing and the second housing,
   wherein the first housing and the second housing define a passage for receiving a stress member, the passage comprising a connector for coupling the seismic data collection system to the stress member, the connector configured to establish a physical and at least one of an electrical or inductive connection between the stress member and at least one of the first housing and the second housing, the connector being configurable in a first position where the stress member can freely pass through the passage during deployment, and
   wherein physically coupling the first housing and second housing establishes the electrical interface.

2. The seismic data collection system of claim 1, wherein physical coupling of the first housing to the second housing electrically couples at least a first component in the first housing to a second component in the second housing.

3. The seismic data collection system of claim 1, wherein one of the first housing and second housing comprises a power source.

4. The seismic data collection system of claim 1, wherein the connector is configurable in:
   a second position where the connector couples to the stress member to facilitate deployment of the seismic data collection system.

5. The seismic data collection system of claim 1, wherein the seismic data collection system is configured to receive a clock signal via a deployment stress member.

6. The seismic data collection system of claim 5, wherein the clock is a slave clock, and the clock signal received via the deployment stress member is generated by a master clock configured to synchronize the slave clock.

7. The seismic data collection system of claim 1, wherein the seismic sensors comprise one or more of accelerometers, geophones, and hydrophones.

8. A seismic data collection system, comprising:
   a first housing comprising one or more seismic sensors and a clock;
   a second housing comprising a battery and memory, wherein the first housing is configured to detachably couple to the second housing, and wherein the first and second housing are fully enclosed; and
   a connector formed by the first housing and the second housing, wherein the connector is configured to establish a physical and at least one of an electrical or inductive connection between a stress member and at least one of the first housing and the second housing, wherein physically coupling the first housing and second housing establishes an electrical interface between the first housing and the second housing.

9. The seismic data collection system of claim 8, wherein physical coupling of the first housing to the second housing electrically couples the one or more seismic sensors to the memory.

10. The seismic data collection system of claim 8, wherein the second housing further comprises a power source.

11. The seismic data collection system of claim 8, wherein the connector resides on the outside of the at least one of the first housing and the second housing and facilitates physical deployment of the seismic data collection system.

12. The seismic data collection system of claim 8, wherein the clock is configured to receive a synchronization signal from a deployment stress member, wherein the synchronization signal is received from a master clock coupled to the deployment stress member.

13. A seismic data collection system, comprising:
at least a first housing comprising a first electrical interface and a second housing comprising a second electrical interface, wherein the first housing is configured to detachably couple to the second housing; and
a plurality of components, comprising:
one or more seismic sensors;
a clock; and
memory,
wherein the first housing and the second housing define a passage for receiving a stress member, the passage comprising a connector for coupling the seismic data collection system to the stress member, the connector configured to establish a physical and at least one of an electrical or inductive connection between the stress member and at least one of the first housing and the second housing, the connector being configurable in a first position, wherein the stress member can freely pass through the passage during deployment,
wherein each of the plurality of components is arranged in one of the first housing and the second housing, and
wherein physical coupling of the first housing to the second housing electrically connects the first electrical interface to the second electrical interface.

14. The seismic data collection system of claim 13, wherein one of the first housing and second housing comprises a power source.

15. The seismic data collection system of claim 14, wherein the first housing comprises the one or more seismic sensors, and wherein the second housing comprises the clock, memory, and power source.

16. The seismic data collection system of claim 13, wherein the electrical first electrical interface and second electrical interface are configured to exchange at least one of data signals, power, clock signals, and control signals.

17. The seismic data collection system of claim 1, wherein at least a portion of the connector is configured to facilitate data communications, power generation, or a combination thereof while in the first position.

* * * * *